US00RE33912E

United States Patent [19]

Lapkowski

[11] E Patent Number: Re. 33,912

[45] Reissued Date of Patent: May 5, 1992

[54] HEAT EXCHANGER

[75] Inventor: Andrew Lapkowski, Winnipeg, Canada

[73] Assignee: Jones Environics Ltd., Winnipeg, Canada

[21] Appl. No.: 675,251

[22] Filed: Mar. 26, 1991

Related U.S. Patent Documents

Reissue of:

[64] Patent No.: 4,848,450
Issued: Jul. 18, 1989
Appl. No.: 154,105
Filed: Feb. 9, 1988

[51] Int. Cl.[5] ..... F28F 3/12

[52] U.S. Cl. ..... 165/166; 165/76; 165/164; 165/167

[58] Field of Search ..... 165/166, 167, 164, 165, 165/76

[56] References Cited

U.S. PATENT DOCUMENTS

T911,013 6/1973 Morgans et al. .
2,434,676 1/1948 Spender .
2,869,835 1/1959 Butt .
3,403,724 10/1968 Gutkowski .
4,308,915 1/1982 Sanders et al. .
4,350,201 9/1982 Steineman .
4,442,886 4/1984 Dinulescu .
4,512,397 4/1985 Stark .
4,527,622 7/1985 Weber .
4,681,155 7/1987 Kredo .

*Primary Examiner*—Larry Jones
*Attorney, Agent, or Firm*—Adrian D. Battison; Stanley G. Ade; Murray E. Thrift

[57] ABSTRACT

A heat exchanger includes a core structure formed by a plurality of plate members in stacked arrangement. Each plate member is square or rectangular and includes along two opposed sides a portion bent at right angles to the basic plate and then bent inwardly to wrap around the next adjacent plate member. The other two sides of the plate member are bent in the opposite direction and then turn inwardly to act as spacers to hold each plate member from the next by a predetermined dimension thus defining cells between each plate member and the next adjacent plate member. This core construction is then assembled in a plurality of separate core members into a frame structure defined by a pair of side frames defining rails along which the core members can slide. The core members are compressed inwardly by a pair of end doors leaving open top and bottom open sides of the frame structure for connection to suitable duct work.

23 Claims, 7 Drawing Sheets

HEAT EXCHANGER

Matter enclosed in heavy brackets [ ] appears in the original patent but forms no part of this reissue specification; matter printed in italics indicates the additions made by reissue.

BACKGROUND OF THE INVENTION

This invention relates to a heat exchanger construction of a type which includes a separable core with the core construction being formed from a plurality of cut and formed metal sheets.

Heat exchangers using metal cores are particularly effective in high efficiency of heat transfer and also resistant to high heat values or high pressure values in comparison with cores using plastic materials. One disadvantage of the use of metal sheets for forming the core has however been the relatively high cost of manufacture involved in folding and forming the sheets into a cell structure, providing suitable spacers for the cells and then assembling the spaced cells into a unitary core construction.

In many cases welding of the sheets to form the cell structure has been used which provides a very rigid structure which is very resistant to heat and pressure but this is of course a highly expensive process involving much labor.

Other techniques are shown in U.S. Pat. Nos. 4,442,886 (Dinulescu), 4,512,397 (Stark), T911,013 (Morgans), 4,527,622 (Weber), 4,308,915 (Sanders), 2,434,676 (Spender) and 4,350,201 (Steineman).

Attention is particularly directed to the Sanders patent which shows an arrangement in which a single sheet is folded to form a planar plate portion and then side edges of the plate portion are folded at right angles and then inwardly and outwardly to define two tab portions generally parallel to the planar plate portion. The planar plate portions are then assembled in stacked arrangement but then a sealing or welding technique is used to separate the fluid paths.

In addition attention is directed to the Dinulescu patent which again shows separate sheets or plates folded into a particular shape but then these plates cooperate with spacer bars which turn along the edges of the plates to hold them at the required spacing. This technique is unsatisfactory in that it involves a large number of separate parts which are difficult to assemble and of course require individual bending and forming.

SUMMARY OF THE INVENTION

It is one object of the present invention therefore to provide an improved structure of heat exchange core which is formed substantially wholly from a stack of the formed separate plate members which are self-spacing and self-attaching to provide a core construction of simple inexpensive nature.

According to a first aspect of the invention therefore there is provided a heat exchanger core for forming a first fluid path and a second fluid path which is fluid imperviously separated from the first fluid path and in heat exchanging relation therewith, said core comprising a plurality of plate members each formed from a substantially rigid sheet metal material and shaped to define a planar plate portion with the plate members assembled so that the plate portions lie in parallel stacked relationship defining between each plate portion and a next adjacent portion on one side a portion of the first fluid path and between said each plate portion and the next adjacent portion on an opposed side a portion of the second fluid path, each said plate member being cut and formed from a single sheet to define said planar plate portion which has a first pair of opposed parallel side edges and a second pair of opposed parallel side edges with the side edges of one pair being at right angles to the side edges of the other pair, two first plate portions each extending from said planar plate portion at a respective one of said first pair of side edges at right angles to said planar portion in the same direction therefrom and to a substantially equal extent therefrom, two second plate portions each extending from an edge of a respective one of the first plate portions remote from said planar plate portion in a direction at right angles thereto and so as to lie back over the planar plate portion, two third plate portions each extending from said planar plate portion at a respective one of said second pair of side edges at right angles to said planar plate portion in the same direction therefrom and to a substantially equal extent therefrom, the third plate portions extending in a direction opposite to the direction of the first plate portions, two fourth plate portions each extending from an edge of a respective one of the third plate portions remote from said planar plate portion in a direction at right angles thereto and to lie back over the planar plate portion, outermost edges of said third and fourth plate portions being rebated from a respective adjacent one of said first pair of side edges by distance greater than the extent of a respective one of the second portions from the respective first portion, an outside extent of said first portions from said planar plate portion of one of said plate members being substantially equal to an inside extent of said third plate portions from said planar portion of a next adjacent one of said members.

It is a further object of the present invention to provide a heat exchanger construction which uses stacked sheet metal core members and which mounts those core members in a simple frame structure of minimum space requirement for attachment to suitable duct work.

According to a second aspect of the invention there is provided a heat exchange device comprising a generally rectangular frame structure defining mutually parallel first and second side openings, mutually parallel third and fourth side openings, the third and fourth side openings lying generally at right angles to the first and second side openings, a pair of frame ends, door means for closing each of the frame ends, a plurality of rectangular core members each defining therein a first fluid path and a second fluid path fluid imperviously separated from the first fluid path and in heat exchanging relation therewith and comprising a plurality of plate members assembled so that planar plate portions thereof lie in parallel stacked relationship defining between each plate portion and a next adjacent portion on one side a portion of the first fluid path and between said each plate portion and a next adjacent plate portion on an opposed side a portion of the second fluid path, each of the core members having a first length parallel to said first fluid path so as to extend from said side opening to said second side opening, a second length parallel to said second fluid path less than the distance between said third side opening and said fourth side opening such as a multiple of the length is equal to said distance, and a third length at right angles to said fluid paths which is less than the distance between said frame ends such that a distance between the frame ends is a multiple of the length of the core member, and guide means mounted on said frame structure by which a core member can slide into the frame structure from one frame end toward the opposed frame end such that the frame structure can be filled with a multiple number of the core members.

With the foregoing in view, and other advantages as will become apparent to those skilled in the art to which this invention relates as this specification proceeds, the invention is herein described by reference to the accompany drawings forming a part hereof, which includes a description of the best mode known to the applicant and of the preferred typical embodiment of the principles of the present invention in which:

DESCRIPTION OF THE DRAWINGS

In the drawings like characters of reference indicate corresponding parts in the different figures.

DETAILED DESCRIPTION

Figure 1:
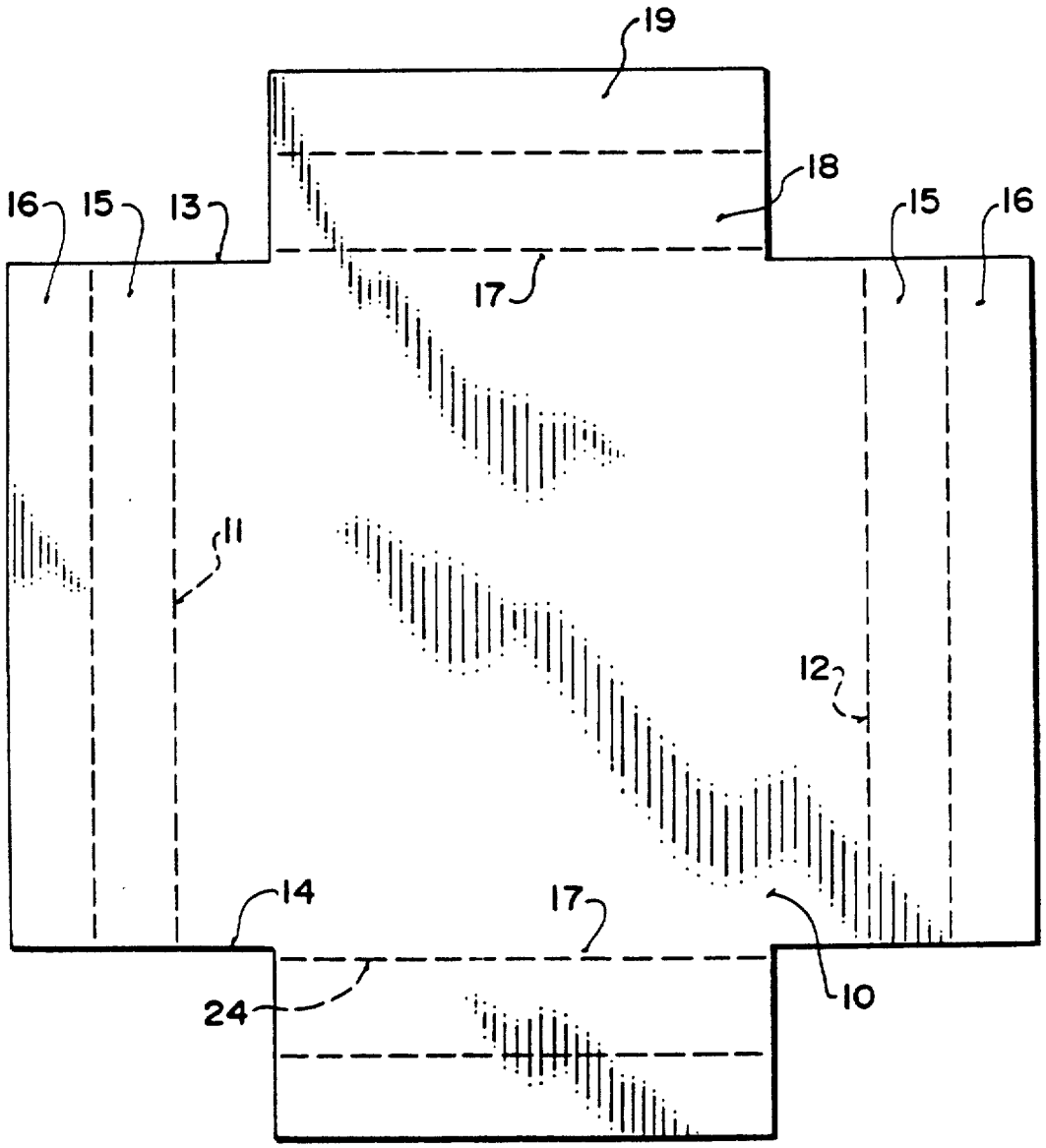
FIG. 1 is a plan view of a blank of a metal sheet showing in dotted line the intended folds by which the blank can be formed into a plate member for assembly into a heat exchange core according to the invention.
Figure 2:
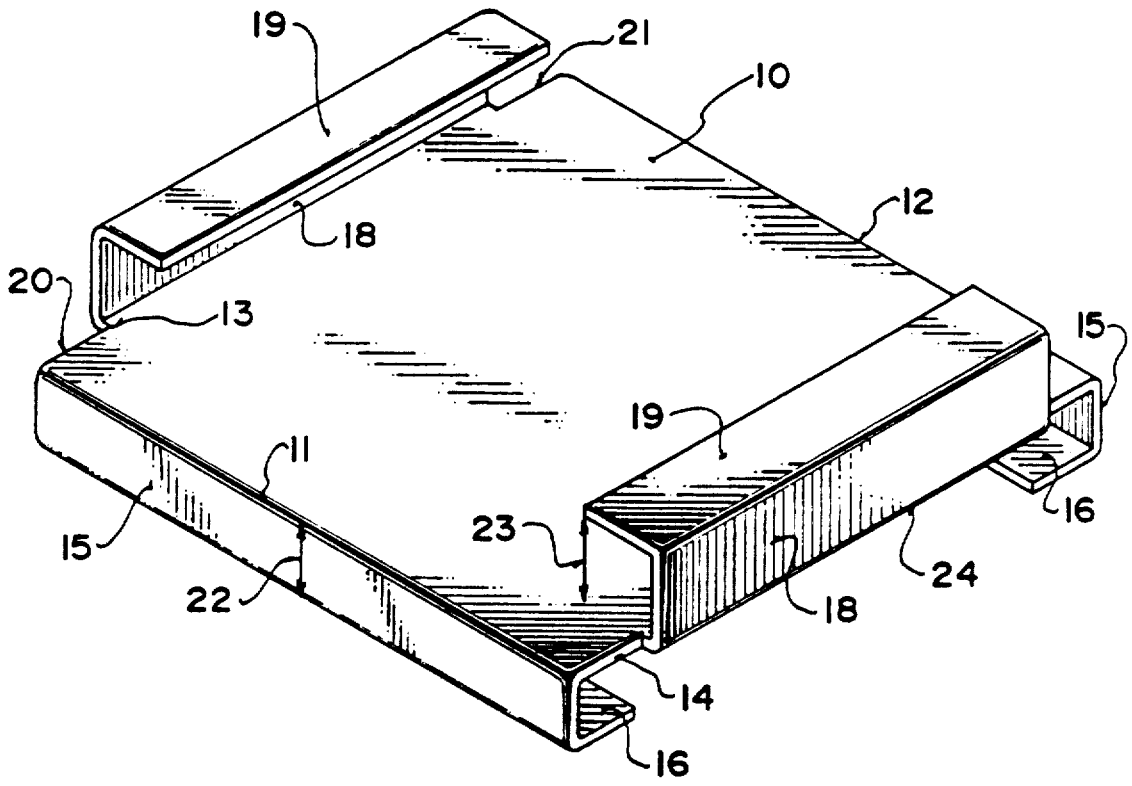
FIG. 2 is an isometric view of the blank of FIG. 1 after bending to form the plate member.
Figure 3:
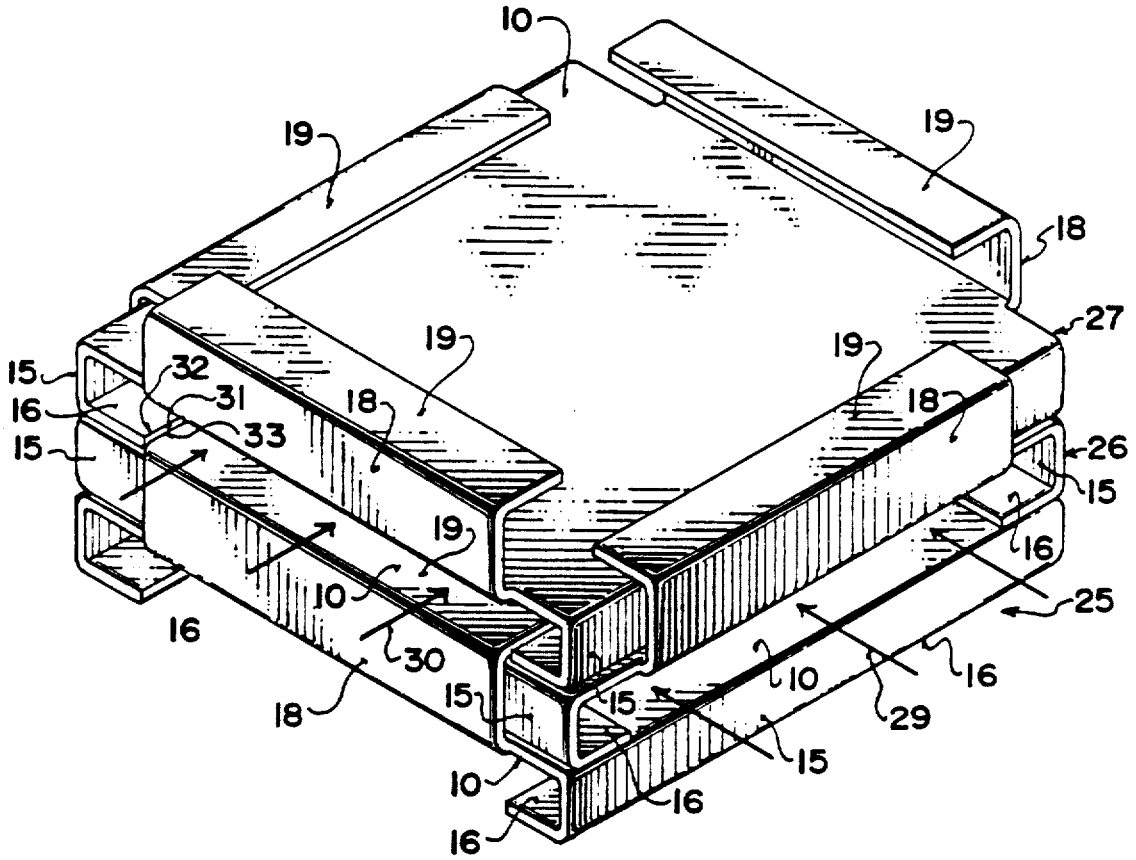
FIG. 3 is an isometric view similar to FIG. 2 showing a plurality of the plate members formed into a stacked construction forming a part of a heat exchange core.

Turning firstly to the basic core construction as shown in FIGS. 1, 2 and 3, there is shown initially a core which is of square construction that is it has equal length fluid paths and in addition the fluid paths are of the same cross sectional area.

A blank for forming each plate member of the core is shown in FIG. 1 and is formed of a thin sheet metal plate which may be stainless steel or aluminum or other suitable material which is generally rigid and resistant to corrosion with the blank having been cut to the shape as shown in an initial cutting step. The sheet metal material may be of a gauge which provides a thickness of the order of 0.5 mm.

The blank is cut in the shape as shown to define a square planar main plate portion 10 which in effect defines the plate which separates each fluid path from the next adjacent fluid path. The main plate portion 10 is square defined by dotted line sides 11 and 12 which are spaced and parallel and sides 13 and 14 which are similarly spaced and parallel and arranged at right angles to the first pair of sides.

Along each of the sides 11 and 12 is provided a first portion 15 of the sheet material and a second portion 16 outwardly thereof and connected thereto.

Along each of the sides 13 and 14 is defined in an initial thin portion 17, a third portion 18 and a fourth portion 19 with again these portions being formed integrally and extending outwardly from the respective edge of the main plate member. As shown in FIG. 1 intended fold lines are indicated in dash lines separating the portions each from the next. In FIG. 2 the shape of the plate member is shown after folding along the respective fold lines. Thus it will be noted that the main plate portion 10 remains a flat sheet. From that flat sheet the portion 15 is bent downwardly at right angles about the edge 11. The portion 16 is then bent inwardly at right angles to the portion 15 so as to lie back directly underneath the plate 10.

The portion 18 is bent at right angles to the plate but in a direction opposite to the portion 15 so as to be upstanding from the plate 10. The portion 19 is again bent at right angles so as to extend back across the upper surface of the plate 10.

The portions 15 and 16 extend along the full length of the edges 11 and 12. The portions 18 and 19 are rebated inwardly from the outer edge 11 and 12 so as to form a free portion 20 and 21 of the edge 13 on either side of the portions 18 and 19. The free portions 20 and 21 are arranged to have a length substantially equal to or greater than the inward extent of the portion 16.

The downward extent of the portions 15 as measured on the outside thereof that is incorporating the thickness of the material as indicated at 22 is arranged to be substantially equal to the height of the portion 18 from the plate 10 as measured on the inner surface thereof that is excluding the thickness of the plate as indicated at 23. In order to provide this slight difference in dimension, the thin portion 17 is provided which allows the bend at the fold line indicated at 24 to provide sufficient material firstly to provide the additional height within the portion 18 and in addition to move the portion 18 slightly outwardly from the respective edge 13 and 14.

The extent of the portions 16 and 19 is arranged so that these portions define merely a tab for operating in the manner set forth hereinafter in relation to FIG. 3.

Turning therefore to FIG. 3, a first one of the plate members is indicated at 25, a second one is indicated at 26 and a third one is indicated at 27. The first plate member 25 is oriented so that the portions 18 and 19 lie along one edge facing the viewer and extending upwardly from the plate 10 thereof. The portions 15 and 16 therefore extend along the side edges downwardly from the plate 10.

The next plate member 26 is then assembled onto the first plate member 25 by initially orienting it 90° rotated from the first plate member so that the plate portions 18 and 19 lie along the side edge. The plate portion 26 is then slid in a direction at right angles to the side edge carrying the portions 18 and 19 so that it passes underneath the portions 19 of the plate member 25 with the under surface of the portions 16 in contact with the upper surface of the main portion 10. The upper surface of the portion 10 of the plate member 26 lies in contact with the under surface of the portions 19 of the plate member 25. In this way the second plate portion 26 is located and held in position by the downward force provided by the portions 19 and is spaced from the upper surface of the plate member 25 by the under surface of the portion 16. It will be noted that the portions 15 of the second plate member slide within the portions 18 of the first plate member thus requiring the dimensions 22 and 23 as previously described.

The shaping of the plate members thus acts to properly locate the plate members relative to each other and to automatically provide the required spacing between the plate members.

The third plate member 27 is again oriented relative to the second plate member 26 by rotation through 90° so as to take up the same orientation as the plate member 25. The plate member 27 is then slid again longitudinally as previously described in relation to the plate 26 so as to take up in relation to the plate 26 the same configuration as that configuration between the plate 26 and the plate 25.

It will be noted that the partial construction of the core shown by the assembled three plate members defines two separate cells for fluid path as indicated by the arrows 29 and 30. Both of these fluid paths are defined basically by the spaced main plate portions 10 with only a double thickness of the sheet metal material being formed along the outermost extremes of the main plate portion as provided by the portions 16 and 19. For this reason the inward extent of the portions 16 and 19 is maintained at a minimum to avoid reducing the efficiency of the heat exchange across the plate 10. In relation to the portion 16, this acts to provide a strengthening effect of the portion 15 and to hold the spacing of the plate portions one from the next. In regard to the portions 19, these are of sufficient extent to grasp the edge of the portion 10 of the next adjacent plate member to hold it in its required position and to prevent it escaping without buckling of the parts. The absolute size of these tabs or plate portions 16 and 19 will be determined by various criteria including the thickness of the material and the size of the plates 10 but in one example the extent of these portions can be of the order of 2 cm. in a core having plates of the order of 50 cm. in transverse dimension.

To provide maximum stiffness of the construction, the portions 15 and 16 extend along the whole length of the respective edge and the portions 18 and 19 extend along the whole length of the respective edge apart from the rebated portions 20 and 21 as previously described. The rebated portions 20 and 21 are provided and dimensioned equal to the inward extent of the portion 16 so that, as shown in FIG. 3, there is no overlap in the area indicated at 31 and the innermost edge 32 of the portion 16 lies closely adjacent to the outermost edge 33 of the portion 19 without overlap.

Figure 6:
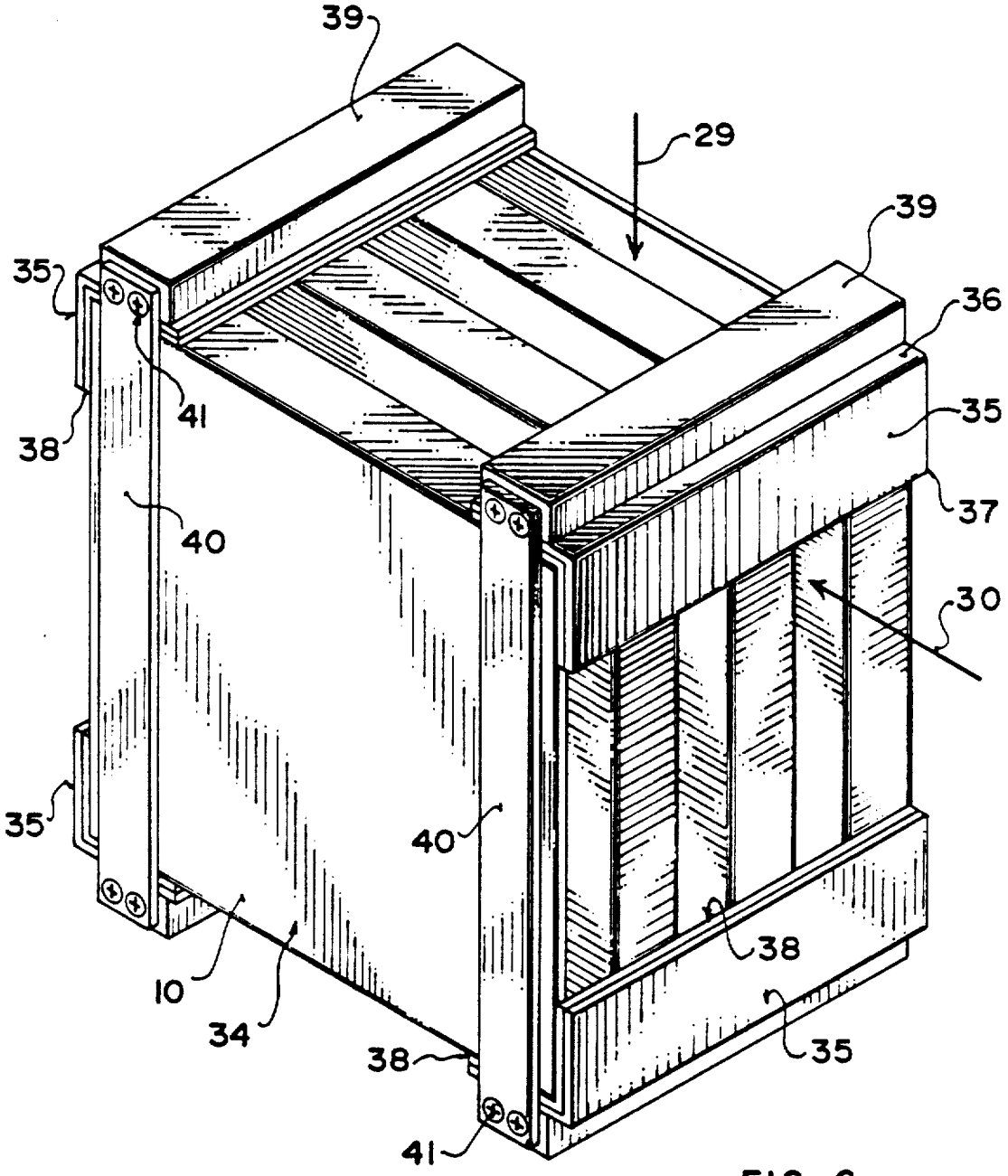
FIG. 6 is an isometric view of one part of the completed core using the stacked structure of FIG. 3.

Turning now to FIG. 6, the assembled plate members are indicated generally at 34 and for convenience of illustration the portions 16 and 18 are omitted showing only the fluid paths 29 and 30. The assembly is completed by four angle brackets 35 which are engaged around the corners of the assembled structure of plate members. Each angle bracket 35 has a pair of strips 36 and 37 each of which is of a dimension substantially equal to the inward extends of the portion 16 and 19 so as to cover the area at the corner of the assembled structure at which the portions 16 are exposed and shown in the corner closest to the viewer in FIG. 3. On an inner surface of the angle bracket 35 is provided a sealing gasket 38 which prevents communication of fluid around the corner defined by the angle bracket between the fluid paths. This retains the fluid paths 29 and 30 totally separate from each other so as to prevent or at least inhibit communication of fluid between the two paths and to allow only communication of heat across the surface defined by the plate portions 10. On each of the strips 36 of the angle brackets 35 is provided a channel member 39 which is upstanding therefrom so as to define a rib running along the length of the core structure adjacent the side edge thereof. In order to retain the angle bracket 35 in place, four straps 40 are attached each connected at its respective ends to a respective one of the channel members by a projecting member (not shown) which is inserted into the channel member which is attached to the strap by screws 41. The angle bracket 35 thus provide the dual function of sealing the air flows and maintaining the core structure compressed into its required location. In addition the channel members 39 define rails for longitudinal sliding movement of the core structure as explained hereinafter.

Figure 4:
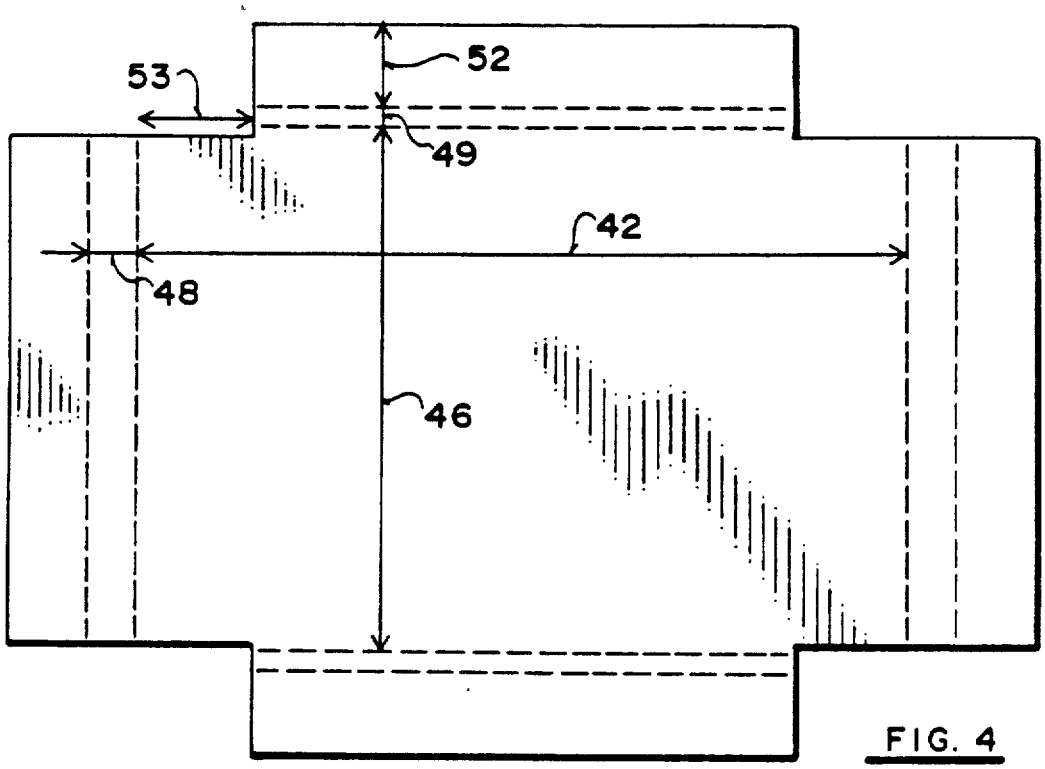
FIG. 4 is a plan view similar to that of FIG. 1 showing a blank for forming a rectangular core having one side dimension longer than the other side.
Figure 5:
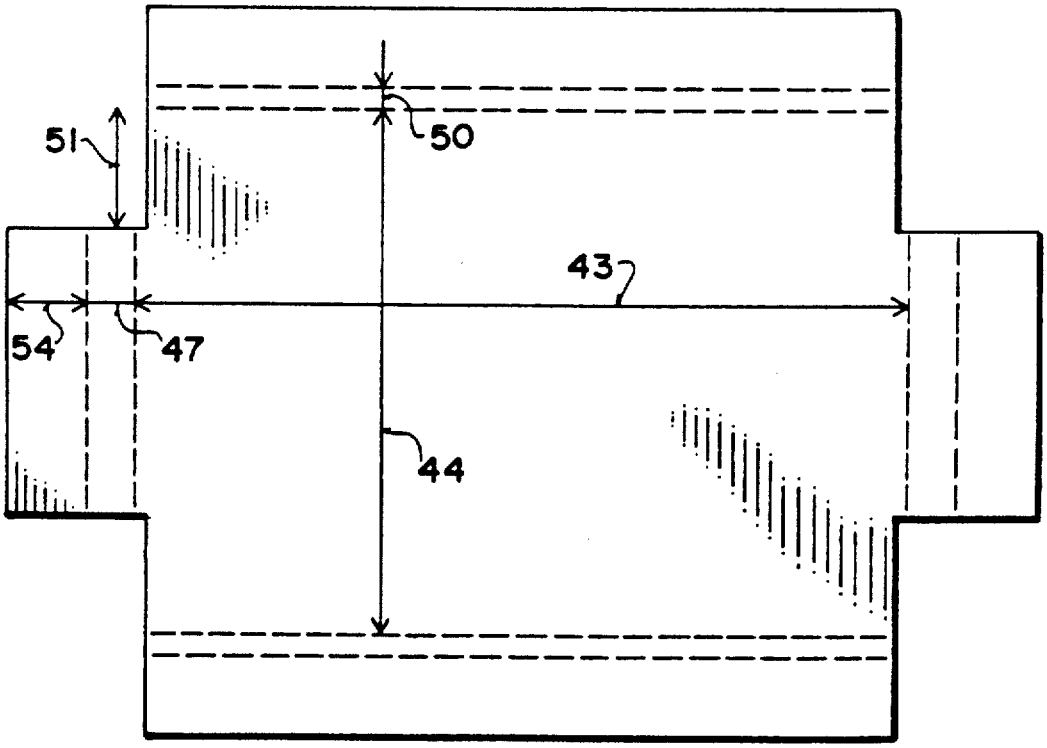
FIG. 5 is a similar plan view of a blank for forming into a plate member for cooperation with that of FIG. 4.

Turning now to FIGS. 4 and 5, there are shown two blanks each for defining a separate plate member. In this case the intended core structure is rectangular rather than square and hence it is necessary to manufacture the core from two separate types of plate member each arranged alternately in the core construction. The intelligent reader will appreciate the core construction merely from the shape of the blank in combination with the explanation previously provided in relation to FIG. 3 and hence no detailed description will be included herein. However it should be noted that in this case the following features are present.

(a) The dimension indicated at 42 in FIG. 4 is equal to the dimension indicated at 43 in FIG. 5.

(b) The dimension indicated at 44 in FIG. 5 is equal to the dimension indicated at 46 in FIG. 4. The above dimensions indicate the dimensions of the basic plate member which will form the dimensions of the core.

(c) The inner dimension indicated at 47 is equal to the outer dimension indicated at 48 forming respectively the portions 18 and 16 as previously described.

(d) Similarly the inner dimension 49 is equal to the outer dimension 50.

(e) The dimension 51 of the plate member of FIG. 5 is substantially equal to or greater than the dimension 52 of the plate member of FIG. 4.

(f) The dimension 53 is substantially equal or greater than the dimension 54 of FIG. 5.

The core construction is formed by the bending into the shape as previously described and the insertion by sliding movement of each plate member of one type into the plate member of the other type in alternate manner as previously described with a sliding movement of course taking place alternately at right angles to take up the position shown basically in FIG. 3.

While one example of the attachment of the corner members is shown in FIG. 6, various corner assemblies can be provided which include a pair of right angled strips which attach along the corners of the core construction and which includes suitable sealing means for preventing fluid around the corners. These strips must then be attached along the sides or diagonally to hold the core as a rigid completed construction. The strips can include suitable mounting arrangements for attachment of the core to a framework with the rails of FIG. 6 providing only one example.

Figure 7:
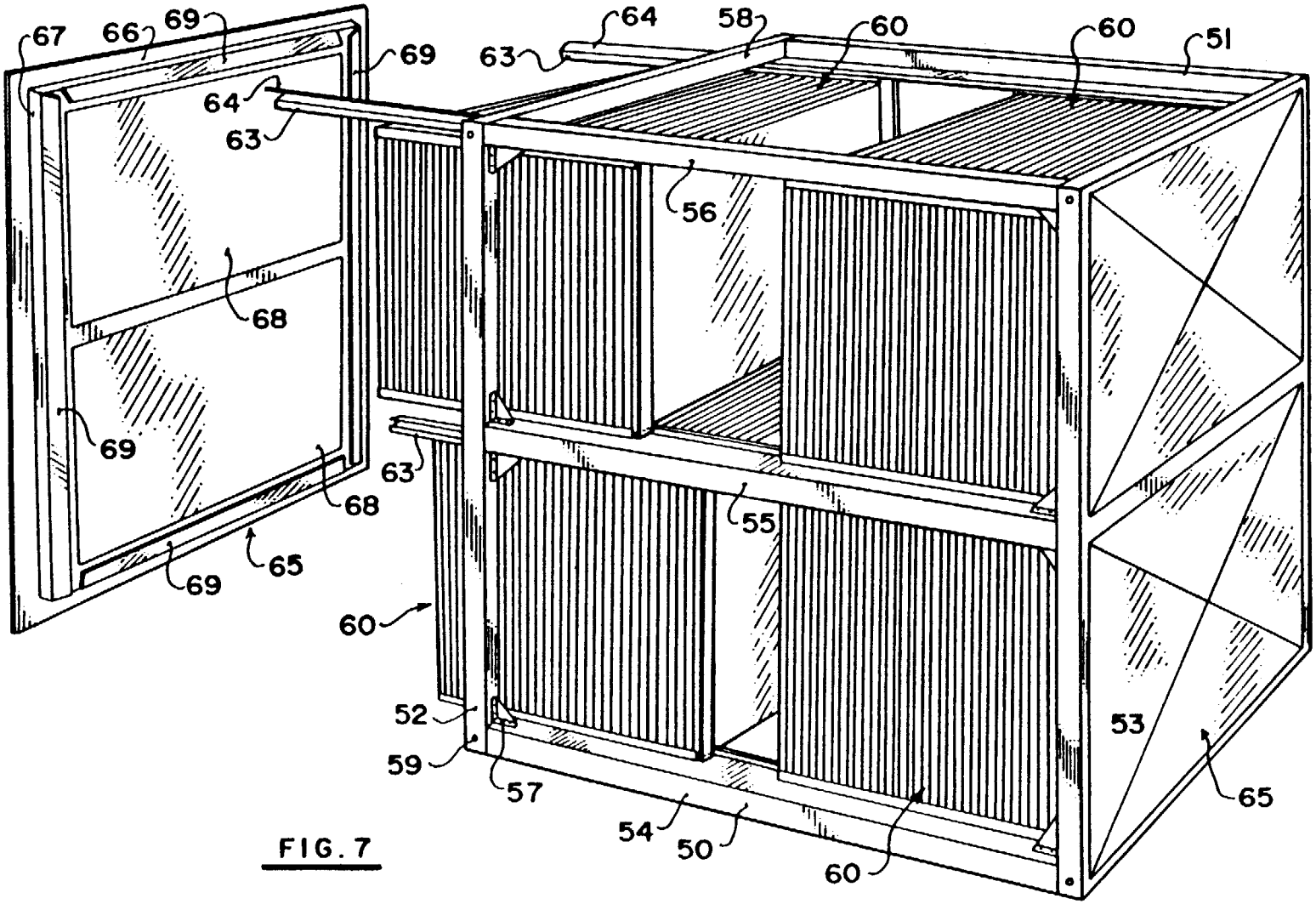
FIG. 7 is an isometric view of a heat exchanger including the core of FIG. 6 and showing the frame structure thereof.
Figure 8:
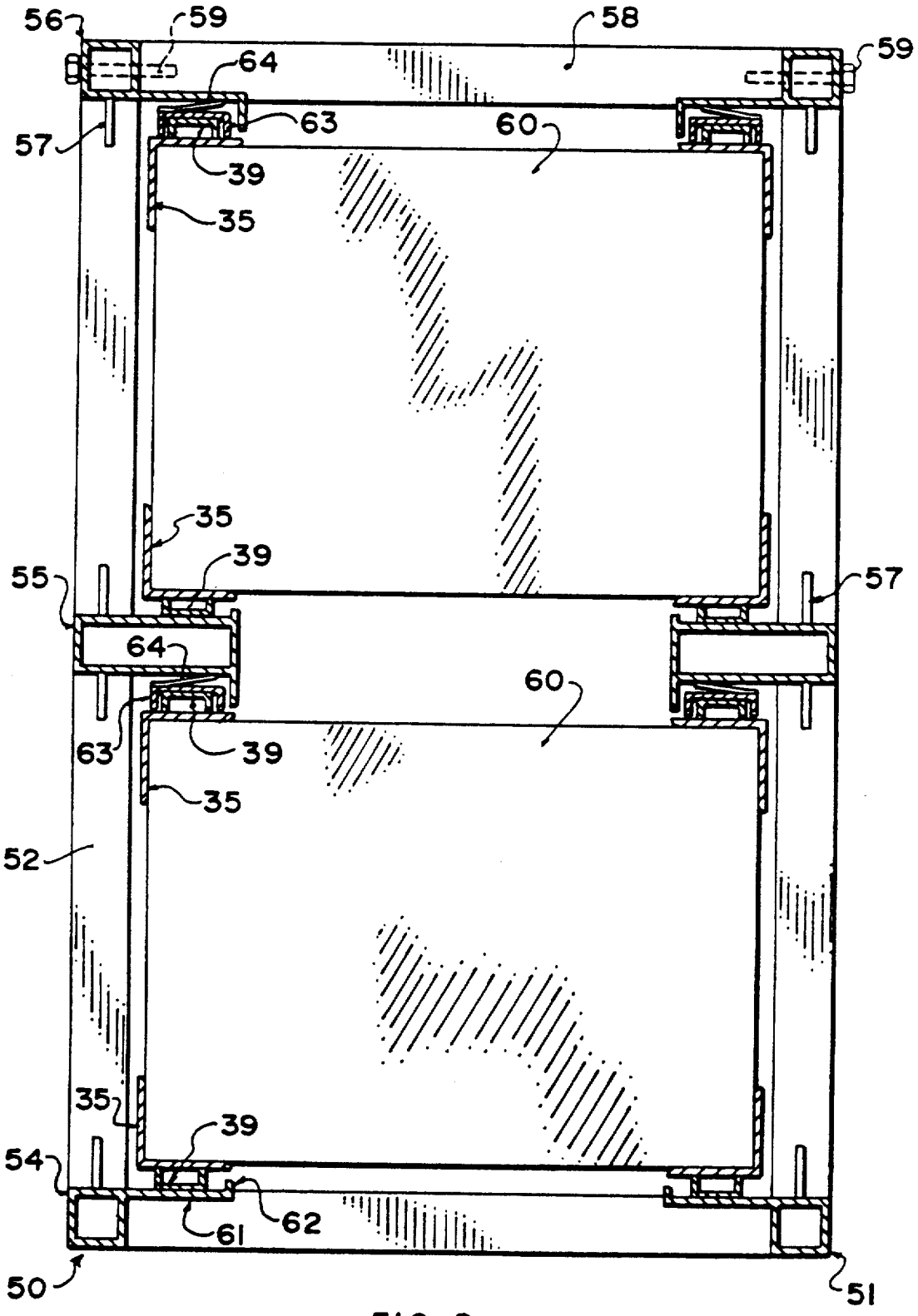
FIG. 8 is a cross sectional view of the heat exchanger of FIG. 7.

Turning now to FIGS. 7 and 8, there is shown a frame construction supporting the heat exchanger cores into a heat exchanger arrangement for attachment to suitable ducting.

The frame structure comprises two side frames 50 and 51 each of which is formed by two upright 52 and 53 and three cross members 54, 55 and 56. The uprights and cross members are formed generally of tubular metal and are welded together to form a rectangular frame piece which is strengthened by the addition of triangular braces 57. The frame pieces 50 and 51 are therefore rigidly and unitarily formed so the frame structure can be broken down into the two separate frame pieces together with the plurality of transverse coupling braces interconnecting the corners of the frames 50 and 51 and indicated at 58. The transverse members 58 are attached to the frames 50 and 51 for example by bolts 59 so as required the whole frame structure can be broken down into the separate frame pieces 50 and 51 and the plurality of separate cross struts. Other techniques for fastening the cross struts to the frame pieces can also be used and the bolts 59 are indicated as an example only.

Each of the cross members 54, 55 and 56 carries a rail arrangement for slidingly supporting the cores generally indicated at 60. Each rail comprises a horizontal surface 61 which projects outwardly from a surface of the tubular member 54, 55 or 56 together with a vertical restraining surface 62 which confines the rib or channel member 39 of the core structure as previously described in relation to FIG. 6. Thus it will be noted that cross member 54 includes a rail at its upper surface. Cross member 55 includes a rail at its upper and at its lower surface, the lower rail cooperating with the rail of the member 54 to define the sliding means for a lower one of the cores 60. Similarly the upper member 56 includes a rail at its lower surface for cooperation with the rail of the upper surface of the member 55 to form a sliding guide arrangement for the upper level of cores 60.

In order to act as a seal and a spring biasing arrangement, between each upper rail and the rib 39 of the core is provided a channel member 63 which faces downwardly and includes a spring plate along its full length as indicated at 64. This channel member 63 sits in the upper rail and provides a sealing effect between the rib 39 of the core and the rail and also biases the core downwardly so that the lower rib 39 forms a seal with the upper rail of the lower cross member. The channel members 63 are freely slidable within the rail and thus can be simply assembled by sliding into place with the cores or subsequent to the cores being positioned in the frame.

The frame thus defines an open top and an open bottom for flow of air through the cores within the frame through a first of the fluid paths. In addition the frame provides open sides so that air can flow through a second of the fluid paths in a substantially horizontal direction through the upper layer of cores and also through the lower layer of cores. Depending upon the arrangement of duct work, the air flow can be arranged at a single pass through both of the layers of cores or can be arranged to turn 180° passing firstly through the upper layer and backwardly through the lower layer. The duct work is not shown as it does not comprise part of the invention. Suitable duct work manufactured from sheet metal material can be attached for example by self-tapping screws to the frame members as will be well known to one skilled in the art.

Ends of the framework are closed by a pair of doors indicated at 65. Each door comprises an end panel 66 which is of a size to substantially cover the end face of the frame and an upstanding box section 67 which contains an insulating material and is closed by a front panel 68. Around the periphery of the box section 67 is provided a sealing strip 69 in the form of a spring plate attached to the box section around its periphery and extending inwardly of the periphery and longitudinally of the frame structure for engaging the end face of the adjacent core members. This acts as a seal and also acts to compress the core members into place to hold them in location.

The number of cells in each of the core members is chosen so that the core member can be readily handled manually for insertion into the frame structure. It will be appreciated in this regard that the frame structure may in some cases have to be positioned at an inconvenient place in a building so it will be necessary for the core structures to be handled while the operative is for example above ground level on a ladder or scaffolding. Each core member will generally therefore have a depth of the order of 1 foot so that its weight is readily manageable by the average operative. In such a case four such core members can be inserted into the upper layer of cores and four similarly into the lower layer and pressed together by the spring action of the sealing strip 69.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What is claimed is:

1. A heat exchanger core for forming a first fluid path and a second fluid path which is fluid imperviously separated from the first fluid path and in heat exchanging relation therewith, said core comprising a plurality of plate members each formed from a substantially rigid sheet metal material and shaped to define a planar plate portion with the plate members assembled so that the plate portions lie in parallel stacked relationship defining between each plate portion and a next adjacent portion on one side a portion of the first fluid path and between said each plate portion and the next adjacent portion on an opposed side a portion of the second fluid path, each said plate member being cut and formed from a single sheet to define said planar plate portion which has a first pair of opposed parallel side edges and a second pair of opposed parallel side edges with the side edges of one pair being at right angles to the side edges of the other pair, two first plate portions each extending from said planar plate portion at a respective one of said first pair of side edges at right angles to said planar plate portion in the same direction therefrom and to a substantially equal extent therefrom, two second plate portions each extending from an edge of a respective one of the first plate portions remote from said planar plate portion in a direction at right angles thereto and so as to lie back over the planar plate portion, two third plate portions each extending from said planar plate portion at a respective one of said second pair of side edges at right angles to said planar plate portion in the same direction therefrom and to a substantially equal extent therefrom, the third plate portions extending in a direction opposite to the direction of the first plate portions, two fourth plate portions each extending from an edge of a respective one of the third plate portions remote from said planar plate portion in a direction at right angles thereto and to lie back over the planar plate portion, outermost edges of said third and fourth plate portions being rebated from a respective adjacent one of said first pair of side edges by distance greater than the extent of a respective one of the second portions from the respective first portion, an outside extent of said first portions from said planar plate portion of one of said plate members being substantially equal to an inside extent of said third plate portions from said planar plate portion of a next adjacent one of said plate members.

2. The invention according to claim 1 wherein the first pair of side edges are substantially equal to the second pair of side edges to define a substantially square plate portion and wherein the inside extent of the first portions of the planar plate portion are substantially equal to the outside extent of the third portions from the planar plate portion of a single plate member.

3. The invention according to claim 1 wherein the first pair of side edges are different in length from the second pair of side edges to define a substantially rectangular planar plate portion different from a square and wherein there are provided first and second different types of plate members with the first and third portions thereof dimensioned to define different amount of spacing between each planar plate portion and its next adjacent planar plate portion on one side relative to said each planar plate portion and its next adjacent planar plate portion on the other side.

4. The invention according to claim 1 wherein the first and second plate portions extend along the full extent of the respective one of the first pair of side edges.

5. The invention according to claim 1 wherein the third and fourth plate portions extend continuously along the second pair of side edges from said rebated outermost edges thereof.

6. The invention according to claim 1 wherein said rebated outermost edges are arranged at a distance from the respective adjacent one of the first pair of side edges substantially equal to the extent of the second portions with the second portions being substantially equal in extent.

7. The invention according to claim 1 wherein the second and fourth plate portions are small relative to said planar plate portion such that the majority of the planar plate portion is free from contact with the plate portions to allow direct communication of heat therethrough from one fluid path to a next adjacent fluid path.

8. A heat exchange device comprising a generally rectangular frame structure defining mutually parallel first and second side openings, mutually parallel third and fourth side openings, the third and fourth side openings lying generally at right angles to the first and second side openings, a pair of frame ends, door means for closing each of the frame ends, a plurality of rectangular core members each defining therein a first fluid path and a second fluid path fluid imperviously separated from the first fluid path and in heat exchanging relation therewith and comprising a plurality of plate members assembled so that planar plate portions thereof lie in parallel stacked relationship defining between each plate portion and a next adjacent portion on one side a portion of the first fluid path and between said each plate portion and a next adjacent plate portion on an opposed side a portion of the second fluid path, each of the core members having a first length parallel to said first fluid path so as to extend from said first side opening to said second side opening, a second length parallel to said second fluid path less than the distance between said, third side opening and said fourth side opening such that a multiple of the length is equal to said distance, and a third length at right angles to said fluid paths which is less than the distance between said frame ends such that a distance between the frame ends is a multiple of the length of the core member, and guide means mounted on said frame structure by which a core member can slide into the frame structure from one frame end toward the opposed frame end such that the frame structure can be filled with a multiple number of the core members.

9. The invention according to claim 8 wherein each core member is formed from a plurality of plate members each formed from a substantially rigid sheet metal material.

10. The invention according to claim 8 wherein said frame structure comprises a first planar rectangular unitary frame piece and a second planar rectangular unitary frame piece and a plurality of cross members for connection between the frame pieces and separable therefrom to complete the rectangular frame structure.

11. The invention according to claim 10 wherein each of said frame pieces carries a plurality of rail members defining said slide guide means.

12. The invention according to claim 11 wherein each of said frame pieces is formed from a plurality of tubular members connected together to form said frame piece, at least some of said tubular members being rectangular in cross section to define an upper horizontal surface, said upper horizontal surface extending outwardly to one side of said tubular member to define a respective one of said rails.

13. The invention according to claim 8 wherein each of said slide guide means comprises an upper rail member for engaging a rib member on an upper surface of a core member and a lower rail member for engaging a rib member on a lower surface of a core member, at least one of said upper and lower members including spring biasing means for pressing the core member into engagement with the other of the rail members and for defining with said rib members on said core member sealing means.

14. The invention according to claim 8 wherein each of said core members comprises a substantially rectangular body defined by said stacked planar plate portions, said body including a first pair of rib members along one surface thereof adjacent side edges of the surface and a second pair of rib members on an opposed surface along side edges thereof.

15. The invention according to claim 8 wherein each of said door means includes a spring strip extending around a periphery thereof for engaging end faces of adjacent core members so as to compress the core members into the frame structure and so as to form a seal therewith.

16. The invention according to claim 8, each of said plate members being cut and formed from a single sheet of a rigid sheet metal material to define said planar plate portion which has a first pair of opposed parallel side edges and a second pair of opposed parallel side edges with the side edges of one pair being at right angles to the side edges of the other pair, two first plate portions each extending from said planar plate portion at a respective one of said first pair of side edges at right angles to said planar plate portion in the same direction therefrom and to a substantially equal extent therefrom, two second plate portions each extending from an edge of a respective one of the first plate portions remote from said planar plate portion in a direction at right angles thereto and so as to lie back over the planar plate portion, two third plate portions each extending from said planar plate portion at a respective one of said second pair of side edges at right angles to said planar plate portion in the same direction therefrom and to a substantially equal extent therefrom, the third plate portions extending in a direction opposite to the direction of the first plate portions, two fourth plate portions each extending from an edge of a respective one of the third plate portions remote from said planar plate portion in a direction at right angles thereto and to lie back over the planar plate portion, outermost edges of said third and fourth plate portions being rebated from a respective adjacent one of said first pair of side edges by distance greater than the extent of a respective one of the second portions from the respective first portion, an outside of one of said plate members being substantially equal to an inside extent of said third plate portions from said planar plate portion of a next adjacent one of said plate members.

17. The invention according to claim 16 wherein the first pair of side edges are substantially equal to the second pair of side edges to define a substantially square plate portion and wherein the inside extent of the first portions of the planar plate portion are substantially equal to the outside extent of the third portions from the planar plate portion of a single plate member.

18. The invention according to 16 wherein the first pair of side edges are different in length from the second pair of side edges to define a substantially rectangular planar plate portion different from a square and wherein there are provided first and second different types of plate members with the first and third portions thereof dimensioned to define different amount of spacing between each planar plate portion and its next adjacent planar plate portion on one side relative to said each planar plate portion and its next adjacent planar plate portion on the other side.

19. The invention according to claim 16 wherein the first and second plate portions extend along the full extent of the respective one of the first pair of side edges.

20. The invention according to claim 16 wherein the third and fourth plate portions extend continuously along the second pair of side edges from said rebated outermost edges thereof.

*21. A heat exchanger core for forming a first fluid path and a second fluid path which is fluid imperviously separated from the first fluid path and in heat exchanging relation therewith, said core comprising a plurality of first plate members and a plurality of second plate members, each of said first and second plate members being formed from a substantially rigid sheet metal material and shaped to define a planar plate with the first and second plate members being assembled alternately so that the plates lie in parallel stacked spaced relationship, the space between the plate of each first plate member and the plate of a next adjacent second plate member on one side defining a part of the first fluid path and the space between the plate of said each first plate member and the plate of the next adjacent second plate member on an opposed side defining a part of the second fluid path, and a plurality of first and second connecting means each first connecting means coupling one of said first plate members to the next adjacent second plate members on a respective side of said one of said first plate members and defining between said one of said first plate members and said next adjacent second plate member a first and a second guiding wall each bridging the space between said one of the first plate members and said next adjacent second plate member at a respective one of two parallel edges of said one of the first plate member and said next adjacent second plate member and forming side edges of said part of the first fluid path, each second connecting means defining between one of said first plate members and the other of said next adjacent second plate members a third and a fourth guiding wall each bridging the space between said one of said first plate members and said other of said next adjacent second plate members at a respective one of two parallel edges of said one of the first plate members which parallel edges are at right angles to the parallel edges of the first and second guiding walls, said third and fourth guiding walls forming side edges of said part of the second fluid path, each said first and second connecting means consisting solely of integral portions of at least one of said one of said first plate members and said next adjacent second plate member and including portions bent at right angles to said plates to define said guiding walls and portions parallel to said plates defining a pair of slots, each slot defined by a pair of spaced parallel side surfaces, and a base connecting said side surfaces along adjacent edges of said side surfaces leaving an open mouth along said side surfaces opposite said base, the side surfaces lying parallel to said plates and the base lying generally at right angles to the plates with the base of one slot of the pair being parallel to the base of the other slot of the pair and spaced across the width of the plates, such that each first plate member is connected to the next adjacent second plate member by sliding movement in a direction parallel to the plates with portions of one of said first plate member and said next adjacent second plate member entered into engagement with said side surfaces of said slot thus holding said plates against any movement in a direction at right angles to said plates.*

*22. The core according to claim 21 wherein the base of each slot lies parallel to the guiding wall of the respective connecting means such that each first plate member moves into engagement with the next adjacent second plate member by movement in a direction parallel to the first and second guiding walls and each second plate member moves into engagement with the next adjacent first plate member by movement in a direction parallel to the third and fourth guiding walls.*

*23. The core according to claim 21 wherein each of the slots extend substantially along the full length of an adjacent one of the guiding walls.*

* * * * *